US012325231B2

(12) United States Patent
Wakayama

(10) Patent No.: US 12,325,231 B2
(45) Date of Patent: Jun. 10, 2025

(54) PRINTING APPARATUS AND METHOD OF CONTROLLING PRINTING APPARATUS

(71) Applicant: CANON KABUSHIKI KAISHA, Tokyo (JP)

(72) Inventor: Naoki Wakayama, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/591,431

(22) Filed: Feb. 29, 2024

(65) Prior Publication Data

US 2024/0198701 A1 Jun. 20, 2024

Related U.S. Application Data

(62) Division of application No. 18/104,648, filed on Feb. 1, 2023, now Pat. No. 11,945,215, which is a division (Continued)

(30) Foreign Application Priority Data

Sep. 30, 2020 (JP) ................................ 2020-165465

(51) Int. Cl.

*B41J 13/00* (2006.01)
*B41J 11/00* (2006.01)

(Continued)

(52) U.S. Cl.

CPC ....... *B41J 13/0036* (2013.01); *B41J 11/0095* (2013.01); *B41J 13/08* (2013.01);

(Continued)

(58) Field of Classification Search

CPC .... B41J 13/0036; B41J 11/0095; B41J 13/08; B41J 11/42; B41J 15/18; B65H 5/062;

(Continued)

(56) References Cited

U.S. PATENT DOCUMENTS 4,945,390 A 7/1990 Hasegawa et al.
6,011,940 A 1/2000 Van Lydegraf (Continued)

FOREIGN PATENT DOCUMENTS

JP 2010-001113 A 1/2010
JP 2013-052929 A 3/2013
JP 2019-214433 A 12/2019

OTHER PUBLICATIONS

Office Action dated Jul. 30, 2024, in Japanese Patent Application No. 2020-165465.

*Primary Examiner* — Henok D Legesse
(74) *Attorney, Agent, or Firm* — Venable LLP

(57) ABSTRACT

A printing apparatus includes a first discharge path that discharges a sheet and a second discharge path different from the first discharge path. An angle difference between a direction in which the sheet is discharged in the second discharge path and a conveyance direction of a conveyance roller is less than an angle difference between a direction in which the sheet is discharged in the first discharge path and the conveyance direction of the conveyance roller. The printing apparatus includes a control unit that discharges the sheet on which the image is printed using the second discharge path even in a case where an instruction to print an image indicates discharging the sheet to the first discharge path, if the sheet conveyed by the conveyance roller is a sheet having a thickness equal to or greater than a predetermined value.

13 Claims, 14 Drawing Sheets

Related U.S. Application Data of application No. 17/475,817, filed on Sep. 15, 2021, now Pat. No. 11,597,219.

(51) Int. Cl.

| | |
|---|---|
| ***B41J 13/08*** | (2006.01) |
| ***B65H 5/06*** | (2006.01) |
| ***B65H 29/60*** | (2006.01) |
| *B41J 11/42* | (2006.01) |
| *B41J 15/18* | (2006.01) |

(52) U.S. Cl.

CPC ............. *B65H 5/062* (2013.01); *B65H 29/60* (2013.01); *B41J 11/42* (2013.01); *B41J 15/18* (2013.01); *B65H 2511/13* (2013.01); *B65H 2511/414* (2013.01); *B65H 2511/52* (2013.01); *B65H 2513/42* (2013.01)

(58) Field of Classification Search

CPC ................ B65H 29/60; B65H 2511/13; B65H 2511/414; B65H 2511/52; B65H 2513/42

See application file for complete search history.

(56) References Cited

U.S. PATENT DOCUMENTS

| | | | | |
|---|---|---|---|---|
| 9,969,192 | B2 * | 5/2018 | Suzuki | B41J 15/04 |
| 11,597,219 | B2 | 3/2023 | Wakayama | |
| 11,945,215 | B2 * | 4/2024 | Wakayama | B65H 5/062 |
| 2010/0044949 | A1 * | 2/2010 | Nakamura | B65H 43/06<br>271/3.17 |
| 2016/0280495 | A1 | 9/2016 | Kodama | |
| 2019/0375218 | A1 | 12/2019 | Sasaki et al. | |

* cited by examiner

PRINTING APPARATUS AND METHOD OF CONTROLLING PRINTING APPARATUS

BACKGROUND OF THE INVENTION

Field of the Invention

The present invention relates to a printing apparatus including a plurality of discharge paths.

Description of the Related Art

In a large-format inkjet printing apparatus, printing is performed using a roll-shaped sheet. Further, as this kind of printing apparatus, an apparatus including a plurality of discharge paths is known (see Japanese Patent Laid-Open No. 2010-1113 [hereinafter referred to as Document 1]). Document 1 describes a technique for switching between the discharge destinations of a sheet depending on cut wastes generated in a printing process, the curling amount, the size, the specifications, and the like of the sheet.

In a printing apparatus including a plurality of discharge paths, it is required to selectively determine a discharge path depending on a discharge condition. Even in the case of using the technique of Document 1, there is a possibility that a switch to an appropriate discharge path cannot be made under a discharge condition which is not considered in Document 1.

SUMMARY OF THE INVENTION

A printing apparatus according to one aspect of the present invention includes a conveyance roller configured to convey a sheet; a print head configured to print an image on the sheet conveyed by the conveyance roller; a first discharge path configured to discharge the sheet printed with the print head; a second discharge path configured to discharge the sheet printed with the print head, the second discharge path being different from the first discharge path; and a control unit configured to perform control to discharge the sheet in the first discharge path or the second discharge path, wherein an angle difference between a direction in which the sheet is discharged in the second discharge path and a conveyance direction of the conveyance roller is smaller than an angle difference between a direction in which the sheet is discharged in the first discharge path and the conveyance direction of the conveyance roller, and even in a case where an instruction to print an image indicates discharging the sheet to the first discharge path, if the sheet conveyed by the conveyance roller is a sheet having a thickness equal to or greater than a predetermined value, the control unit discharges the sheet on which the image is printed using the second discharge path.

Further features of the present invention will become apparent from the following description of exemplary embodiments with reference to the attached drawings.

BRIEF DESCRIPTION OF THE DRAWINGS

FIG. 9 is a diagram showing the relationship of FIGS. 9A and 9B;

DESCRIPTION OF THE EMBODIMENTS

Figure 1:
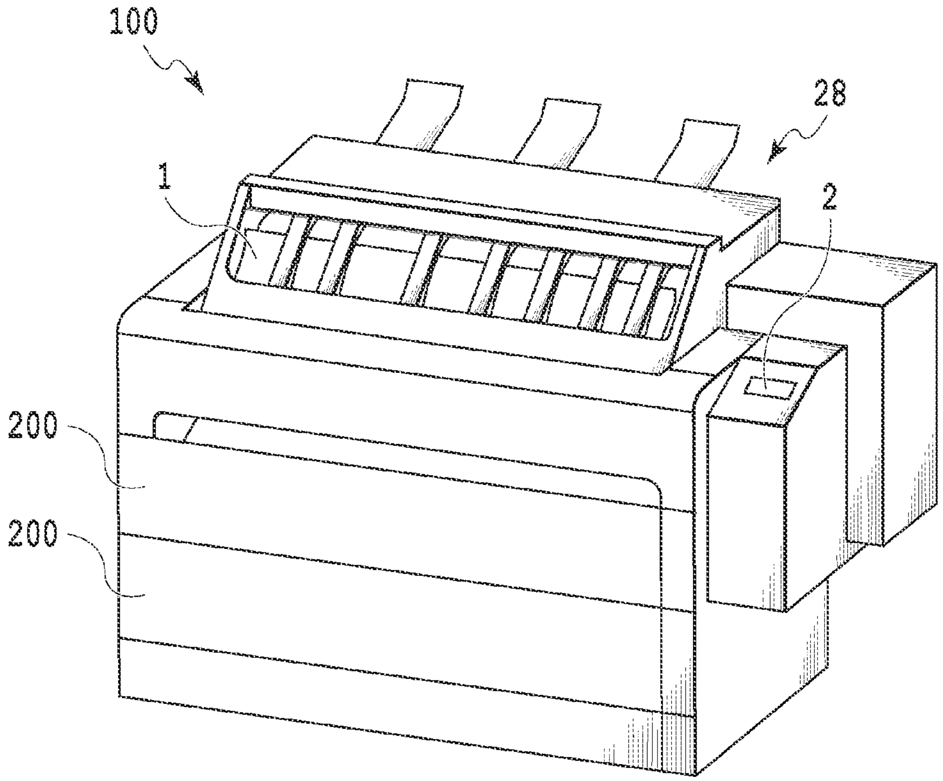
FIG. 1 is a schematic perspective view of a printing apparatus.

A description will be given below of embodiments of the present invention with reference to the drawings. Incidentally, the following embodiments do not limit the present invention, and not all combinations of features described in the present embodiments are essential for a solving means of the present invention. The same constituent elements in the different embodiments will be described with the same reference numerals.

<Description of a Printing Apparatus>

A description will be given of a printing apparatus applied to the present embodiment with reference to FIGS. 1 to 5. The printing apparatus of the present embodiment is an inkjet printing apparatus including a sheet feeding unit for feeding a sheet, a print unit for printing an image on the sheet fed from the sheet feeding unit, and a discharge unit including a plurality of discharge paths for discharging the sheet on which the image is printed. The discharge unit has two discharge paths at a top surface portion of the printing apparatus and a front surface portion of the printing apparatus, respectively, and is configured to selectively discharge the sheet to either one of the two.

FIG. 1 is a schematic perspective view of a printing apparatus 100. The printing apparatus 100 has a plurality of (specifically two) sheet feeding units 200. In each sheet feeding unit 200, long sheet-shaped paper wound in a roll shape is set as a print medium. A stacker 28 is arranged in an upper portion of the printing apparatus 100. An operation panel 2, which is an operation unit, is arranged on a front surface of the printing apparatus 100. A user can use various switches provided on the operation panel 2 and the like to input various commands to the printing apparatus 100, such as designating the size of a sheet 1, switching between online/offline, and setting the discharge destination. FIG. 1 shows a state where the sheet 1 is discharged toward the stacker 28. That is, FIG. 1 shows a schematic view of a state where a top surface discharge using the top surface of the printing apparatus is performed in the printing apparatus 100.

Figure 2:
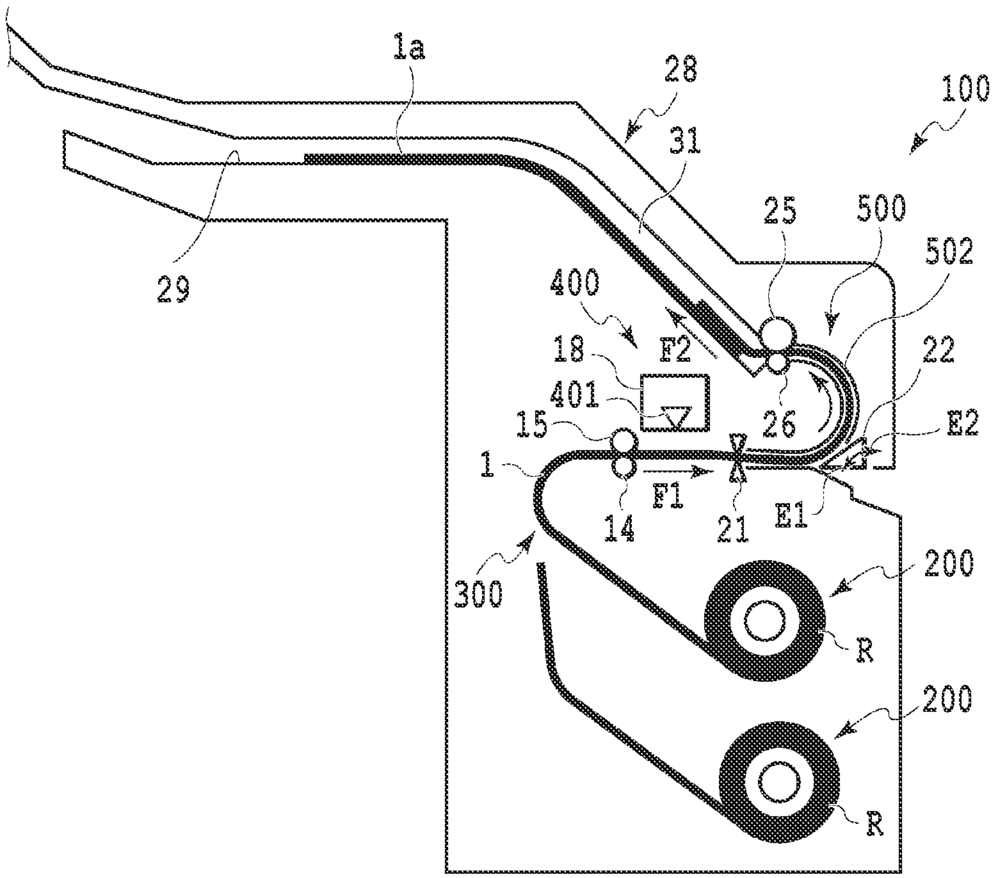
FIG. 2 is a schematic cross-sectional view of the printing apparatus.

FIG. 2 is a schematic cross-sectional view of the printing apparatus 100. As in FIG. 1, FIG. 2 shows a cross section in a state where the top surface discharge is performed. As shown in FIG. 2, each sheet feeding unit 200 is set with a roll-shaped sheet R wound in a roll shape as a print medium. The roll-shaped sheets R set in the sheet feeding units 200 arranged one above the other are selectively drawn out, and an image is printed on the sheet 1 drawn out. In the present specification, although the sheet 1 and the roll-shaped sheet R indicate the same print medium, the different expressions are used for convenience of description. That is, in the present specification, the print medium in a state of being wound in a roll shape and stored in the sheet feeding unit 200 is referred to as the roll-shaped sheet R, and the print medium in a state of being drawn out from the sheet feeding unit 200 is referred to as the sheet 1. An image is printed on the sheet 1 selectively drawn out from the two roll-shaped sheets R set in the sheet feeding units 200 arranged one above the other in the printing apparatus 100. Then, the sheet 1 on which printing has been completed is discharged to the stacker 28 provided in the upper portion of the printing apparatus.

A series of processes of control will be schematically described with reference to FIG. 2. In a case where the roll-shaped sheet R is set in the sheet feeding unit 200, the roll-shaped sheet R is drawn out toward a sheet conveyance unit (conveyance mechanism) 300, and the sheet 1 starts to be fed. This operation is performed automatically by the sheet feeding unit 200 or is implemented by the user manually drawing the sheet 1 out from the roll-shaped sheet R. The sheet 1 drawn out from the roll-shaped sheet R by the sheet feeding unit 200 is conveyed by the sheet feeding unit 300 to a print unit 400 capable of printing an image along a sheet conveyance path.

The sheet 1 guided to the print unit 400 is conveyed in a conveyance direction F1 by a conveyance roller 14. A nip roller 15 can be driven to rotate in response to the rotation of the conveyance roller 14. An inkjet print head 18 in the print unit 400 includes an optical sensor 401. The sheet 1 is conveyed to a position where the sheet 1 can be detected with the optical sensor 401. In a case where the sheet 1 is conveyed, the diffused reflection value and the specular reflection value of the sheet 1, the thickness value of the print medium (hereinafter, paper thickness), and the like are obtained with the optical sensor 401. The printing apparatus 100 can automatically determine the kind of sheet 1 based on the above values. Alternatively, the user may manually input the kind of sheet through the operation panel 2 so that the printing apparatus 100 determines the kind of sheet 1 based on the input contents. In this way, the printing apparatus 100 is configured so that the kind of sheet 1 conveyed by the conveyance roller 14 can be specified.

The print unit 400 prints an image on the sheet 1 by ejecting ink from the inkjet print head 18. The print head 18 ejects ink from an ejection port using an ejection energy generating element such as an electro-thermal conversion element (heater) or a piezo element. The print head 18 is not limited only to an inkjet type. The printing system of the print unit 400 may also be, for example, a serial scan type or a full-line type. In the case of the serial scan type, the image is printed by alternately repeating a conveyance operation of the sheet 1 and an image printing operation accompanied by scanning of the print head 18 in a direction intersecting the conveyance direction of the sheet 1. In the case of the full-line type, the image is printed by using the long print head 18 extending in a direction intersecting the conveyance direction of the sheet 1 to perform the image printing operation while continuously conveying the sheet 1.

In the printing apparatus 100, it is possible to adjust the print head 18 in order to improve the quality of the print state of the image. In the case of the serial scan type, the image is printed while scanning the print head 18 in the direction intersecting the conveyance direction of the sheet 1. Therefore, in a case where ejection timing is deviated, unevenness is developed in the printed image. Therefore, the ejection timing of the print head 18 is adjusted. The ejection timing is adjusted by printing a head adjustment pattern on the sheet 1 to automatically obtain the result or manually input the result through the operation panel 2. The adjustment of the print head 18 also includes an adjustment for improving image quality by adjusting the inclination of the print head 18 with respect to the conveyance direction of the sheet 1. Further, there is another adjustment that makes it possible to print an image having no margin at a width-direction end portion of the sheet 1 by adjusting an ejection position with respect to the width-direction end portion of the sheet 1.

In the printing apparatus 100, it is also possible to adjust the conveyance roller 14. That is, in the printing apparatus 100, it is possible to adjust the amount of conveyance in order to improve the image quality in the conveyance direction and to increase the accuracy of an image length. A deviation in the amount of conveyance may cause a streak in the printed image or a deviation in the length of the image. These adjustments are also performed by printing a conveyance adjustment pattern on the sheet 1 to automatically obtain the result or manually input the result through the operation panel 2.

A cutter 21 is arranged on the downstream side of the print head 18 in the conveyance direction F1. The cutter 21 performs a cutting operation at the end of printing to cut the sheet 1. A discharge switching flapper 22 revolvable to (in) an E1 or E2 position (direction) in FIG. 2 is arranged on the further downstream side of the cutter 21 in the conveyance direction F1. The discharge switching flapper 22 is configured to revolve to the E1 or E2 position to switch between the positions on the basis of the control by the discharge destination direction instruction control unit (not shown). In the case of performing a top surface discharge, the discharge switching flapper 22 is located on an E1 side. The discharge switching flapper 22 located on the E1 side guides the sheet 1 to a top surface discharge unit 500. The sheet 1 that has passed through the discharge switching flapper 22 is discharged by the top surface discharge unit 500 to the stacker 28 installed in an upper portion of the print unit 400 in a gravity direction. A top surface discharge path 502 including a discharge roller 25 and a discharge nip roller 26 is provided between the top surface discharge unit 500 and the stacker 28. The discharge path has a curved shape, so that the top surface discharge path 502 reverses the discharge direction, and the cut sheet is gripped with the discharge roller 25 and the discharge nip roller 26 to be discharged in a discharge direction F2. The discharged sheet is accommodated in the stacker 28 and loaded on a tray 29 and an upper portion of a loaded sheet 1*a*. Accommodating the discharged sheet in the stacker 28 in the upper portion of the printing apparatus 100 enables large-capacity loading as compared with the case of providing a basket in a lower portion of the printing apparatus 100 to accommodate the sheet. The discharge direction F2 has a large angle difference with respect to the conveyance direction F1 by the conveyance roller. For example, in a case where the conveyance direction F1 has an angle of 0 degrees, in FIG. 2, the discharge direction F2 has an angle of about 120 degrees and the angle difference is about 120 degrees.

Figure 3:
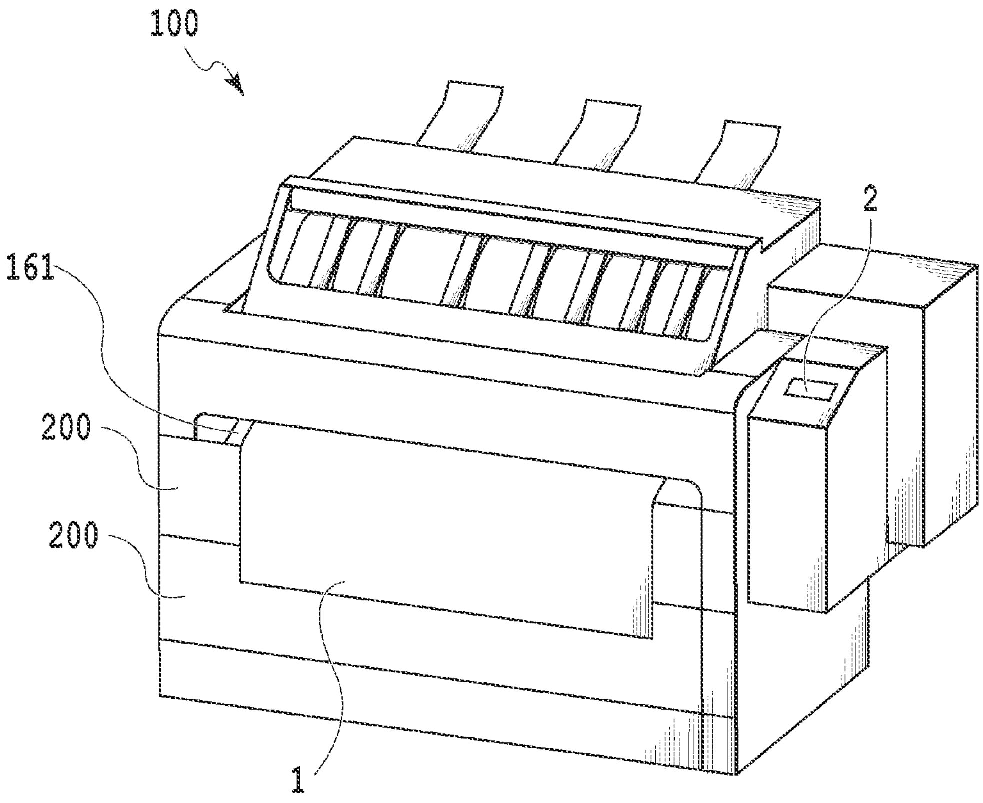
FIG. 3 is a schematic perspective view of the printing apparatus.

FIG. 3 is a diagram showing a schematic perspective view of the printing apparatus 100. FIG. 3 shows a schematic view of a state where in the printing apparatus 100, a front surface discharge is performed using a front surface portion of the printing apparatus. In a front surface discharge operation, the sheet 1 on which printing has been completed is linearly discharged from a front surface discharge support unit 161 provided on the front surface portion of the printing apparatus. That is, in the front surface discharge, the discharge path is not in a curved shape but in a schematically linear shape.

Figure 4:
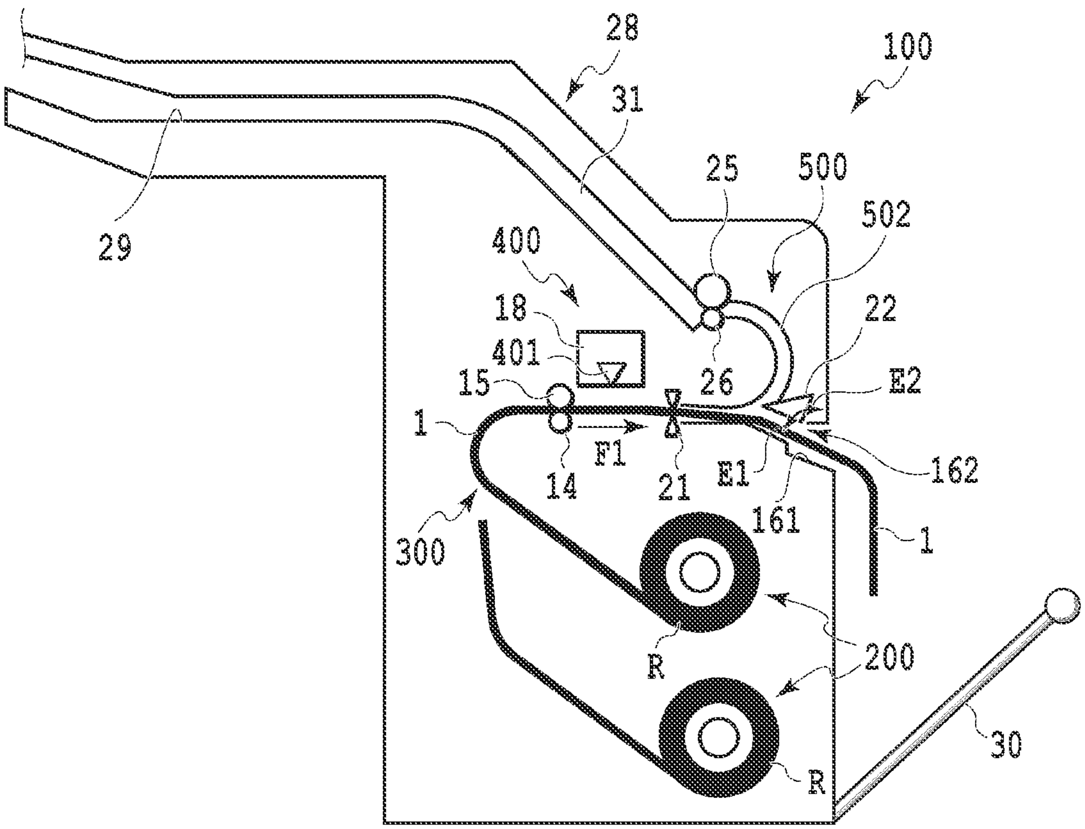
FIG. 4 is a schematic cross-sectional view of the printing apparatus.

FIG. 4 is a schematic cross-sectional view of the printing apparatus 100. As in FIG. 3, FIG. 4 shows a cross section of a state where the front surface discharge is performed. In FIG. 4, the discharge switching flapper 22 arranged on the downstream side of the cutter 21 in the conveyance direction F1 is in a state of having revolved to the E2 position. In a case where the discharge switching flapper 22 is in the E2 position, the discharge switching flapper 22 guides the sheet 1 to the front surface discharge path 162. The sheet 1 that has passed the discharge switching flapper 22 is ejected to the front surface of the printing apparatus through the front surface discharge path 162 above the front surface discharge support unit 161. In a case where the sheet cut after the completion of printing passes through the front surface discharge path 162, the sheet is discharged by its own weight to be accommodated in a front surface discharge accommodation unit 30 which can be drawn out from the lower portion of the printing apparatus. Unlike the top surface discharge path 502, the front surface discharge path 162 is not provided with a discharge roller or a discharge nip roller. The front surface discharge path 162 is in a schematically linear shape, and the angle difference between the discharge direction and the conveyance direction F1 is about 10 degrees as shown in FIG. 4.

Figure 5:
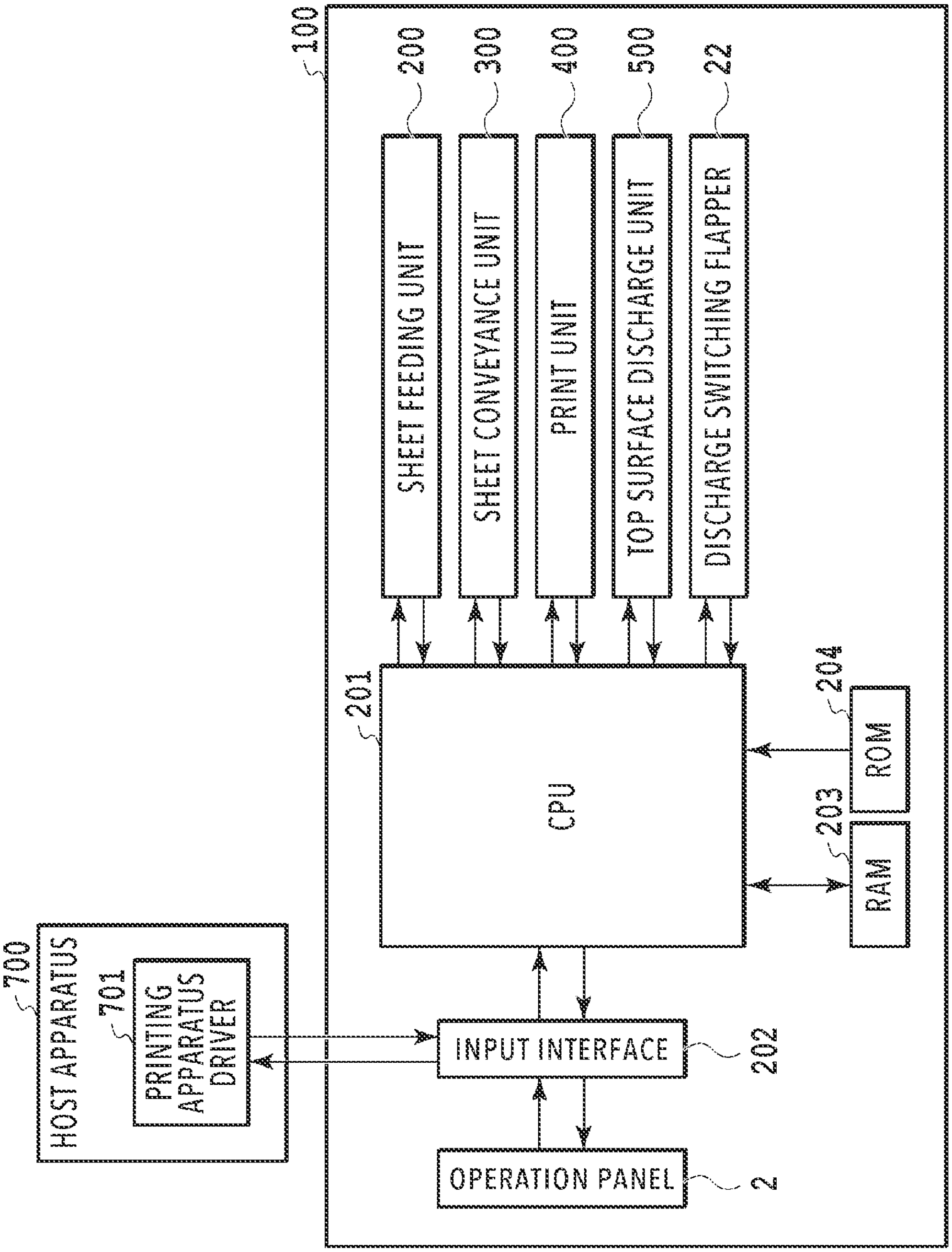
FIG. 5 is a block diagram for describing a configuration example of a control system including the printing apparatus.

FIG. 5 is a block diagram for describing a constituent example of a control system including the printing apparatus 100 of the present embodiment. The printing apparatus 100 includes a CPU 201, an input interface 202, a RAM 203, a ROM 204, and the operation panel 2. The printing apparatus 100 also includes the sheet feeding unit 200, the sheet conveyance unit 300, the print unit 400, the top surface discharge unit 500, and the discharge switching flapper 22. The printing apparatus 100 may also include other constituent elements, but descriptions thereof are omitted here.

The CPU 201 controls each unit of the printing apparatus 100 including the sheet feeding unit 200, the sheet conveyance unit 300, the print unit 400, the top surface discharge unit 500, and the discharge switching flapper 22 in accordance with a control program stored in the ROM 204. The control program in the present embodiment is stored in the ROM 204. The kind, width, various setting information, and the like of the sheet 1 are input to the CPU 201 through the operation panel 2 via the input interface 202. Further, the CPU 201 writes and reads information such as the thickness of the sheet 1 to and from the RAM 203.

Setting information including image data and setting of the discharge destination is input to the CPU 201 from a printing apparatus driver 701 of an external host apparatus 700 via the input interface 202. The host apparatus 700 is a supply source of image data, and specifically, the host apparatus 700 may be a reader unit for reading images or the like in addition to a computer that creates data such as images relating to printing and performs various processes or the like.

Next, a description will be given of the operation of switching between the discharge paths in the printing apparatus 100 of the present embodiment. The printing apparatus 100 can choose the discharge destination of the discharged sheet 1 from between the top surface discharge for discharging the sheet to the stacker 28 installed in the upper portion of the printing apparatus 100 and the front surface discharge for discharging the sheet to the front surface of the printing apparatus 100. Specifically, the user can choose the top surface discharge or the front surface discharge by the operation through the operation panel 2.

<Setting Screen on the Operation Panel>

Figure 6:
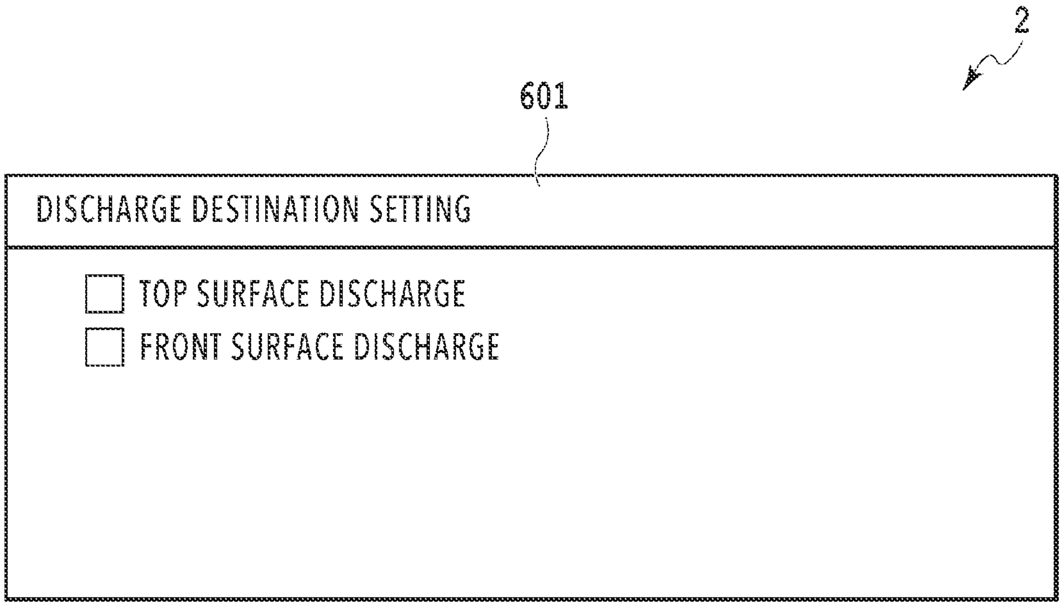
FIG. 6 is a diagram showing a discharge destination setting screen displayed on an operation panel.

FIG. 6 is a diagram showing a discharge destination setting screen 601 displayed on the operation panel 2. The user can selectively designate the "top surface discharge" or the "front surface discharge" on the discharge destination setting screen 601 to set the discharge destination. The discharge destination can be set for each kind of sheet 1. As described above, the kind of sheet 1 may be set by being input by the user via the operation panel 2, or may be set by being detected using the optical sensor 401. The kind of sheet 1 is set for each sheet accommodated in the sheet feeding unit 200.

The top surface discharge path 502 has a U-shaped path as a discharge path, and as shown in FIG. 2, the sheet 1 is inverted to be conveyed. Therefore, the conveyance resistance of the sheet 1 increases. Specifically, in a case where information indicating the kind of sheet 1 is a sheet having a thickness equal to or greater than a predetermined value, the conveyance resistance at the time when the sheet passes through the top surface discharge path 502 is so high that there is a possibility that the conveyance cannot be performed. As described above, some sheets cannot pass through the top surface discharge path 502 due to paper thicknesses. On the other hand, since the front surface discharge path 162 has a discharge path in a schematically linear shape as shown in FIG. 4, even in a case where the sheet 1 has a thickness equal to or greater than the predetermined value, the conveyance resistance at the time when the sheet passes through the front surface discharge path 162 becomes small, and the conveyance is normally performed.

Figure 7:
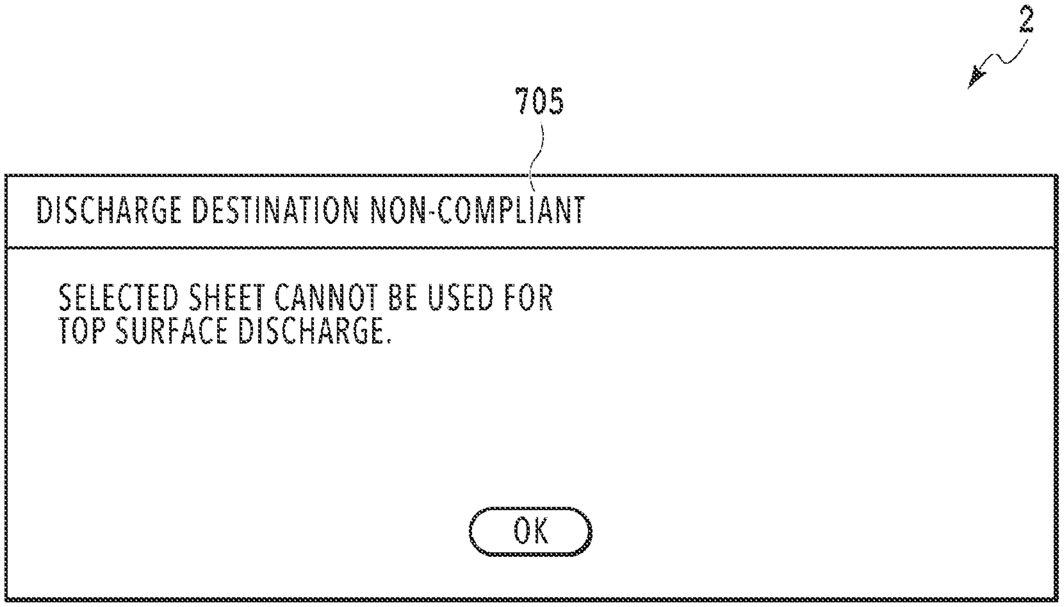
FIG. 7 is a diagram showing a discharge destination non-compliant screen displayed on the operation panel.

In the present embodiment, in a case where the sheet 1 has a thickness equal to or greater than the predetermined value, if the top surface discharge is selected on the discharge destination setting screen 601 on the operation panel 2, a screen shown in FIG. 7 is displayed. More specifically, the CPU 201 of the printing apparatus 100 obtains from the RAM 203 the kind of sheet (or information on the thickness of the sheet) fed to the sheet conveyance unit 300. Then, in a case where the kind of sheet is a sheet having a thickness equal to or greater than the predetermined value, the screen shown in FIG. 7 is displayed on the operation panel 2.

FIG. 7 is a diagram showing a discharge destination non-compliant screen 705 displayed on the operation panel 2. On the discharge destination non-compliant screen 705, a message is displayed saying that "the selected sheet cannot be used for the top surface discharge." In this way, in a case where the sheet 1 has a thickness equal to or greater than the predetermined value, if the top surface discharge is selected on the discharge destination setting screen 601 on the operation panel 2, a screen indicating that the setting cannot be made is displayed. On the discharge destination non-compliant screen 705 in FIG. 7, the user selects "OK" on the operation panel 2 to return to the discharge destination setting screen 601 in FIG. 6. Then, the user selects the front surface discharge. The present embodiment shows, but is not limited to, an example in which after the user selects the discharge setting screen 601, an error screen is displayed in a case where the selection is inappropriate. For example, in a case where the sheet 1 has a thickness equal to or greater than the predetermined value, the discharge destination setting screen 601 in FIG. 6 may be configured so that the top surface discharge cannot be selected on the UI screen by graying out the top surface discharge or the like.

In the present embodiment, the thickness of the sheet 1 equal to or greater than the predetermined value indicates 120 μm or more as an example. The present embodiment shows as an example, but is not limited to, a case where the criterion by which the top surface discharge cannot be selected is a paper thickness. In a case where the top surface discharge is inappropriate due to the kind of sheet, the top surface discharge may be configured not to be selected regardless of the paper thickness. For example, in a case where static electricity is generated due to the material of the sheet 1 to increase the conveyance resistance, the top surface discharge may be configured not to be selected.

The above is a description of the setting of a discharge destination on the printing apparatus 100 side. On the other hand, the discharge destination can also be set from the printing apparatus driver 701 of the host apparatus 700 that supplies image data to be printed.

<Setting Screen in the Printing Apparatus Driver>

Figure 8:
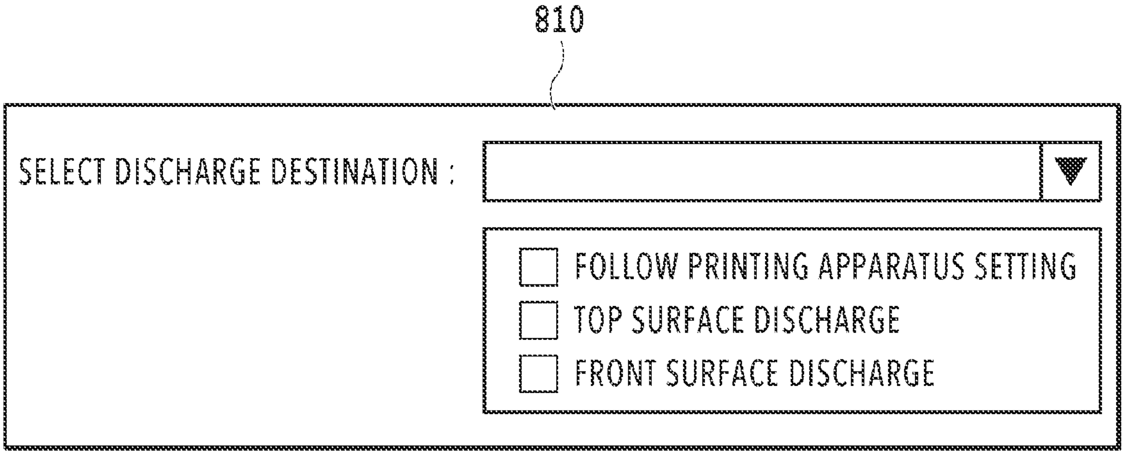
FIG. 8 is a diagram showing an example of a discharge destination selection screen displayed in a printing apparatus driver.

FIG. 8 is a diagram showing an example of a discharge destination selection screen 810 displayed on a display unit (not shown) of the host apparatus 700 in the printing apparatus driver 701 of the host apparatus 700. As shown in FIG. 8, on the discharge destination selection screen 810 of the printing apparatus driver 701, "follow the printing apparatus setting" can be selected in addition to the "top surface discharge" and the "front surface discharge." Selecting "follow the printing apparatus setting" designates following the setting on the discharge destination setting screen 601 on the operation panel 2.

In the case of sending the image data to be printed from the host apparatus 700 to the printing apparatus 100, the image data is sent from the printing apparatus driver 701 to the printing apparatus 100 together with the setting of the discharge destination set by the user. Here, as described above, there are two kinds of settings of the discharge destination: a setting in the printing apparatus driver 701 and a setting on the operation panel 2. Since the user can set the discharge destination in either way, in the case of printing the image data to be printed, the setting using the printing apparatus driver 701 and the setting using the operation panel 2 may be different. In the present embodiment, in a case where the settings of the discharge destination are different, the setting in the printing apparatus driver 701 has priority. In a case where a plurality of users use one printing apparatus, it is presumed that the discharge destinations of the image data sent by the users are different from each other. Therefore, in order to enable a discharge corresponding to the designation of the discharge destination by each user, the setting in the printing apparatus driver 701 has priority. However, as described above, in a case where the top surface discharge cannot be selected, if the "top surface discharge" is set in the printing apparatus driver 701, there is a possibility that conveyance cannot be performed if the top surface discharge is performed in accordance with the setting in the printing apparatus driver 701. A description will be given below of various processes including a case where the setting in the printing apparatus driver 701 and the setting on the operation panel 2 are different with reference to a flowchart.

<Control for Switching Between Discharge Destinations in the Case of Printing Image Data>

Figure 9A:
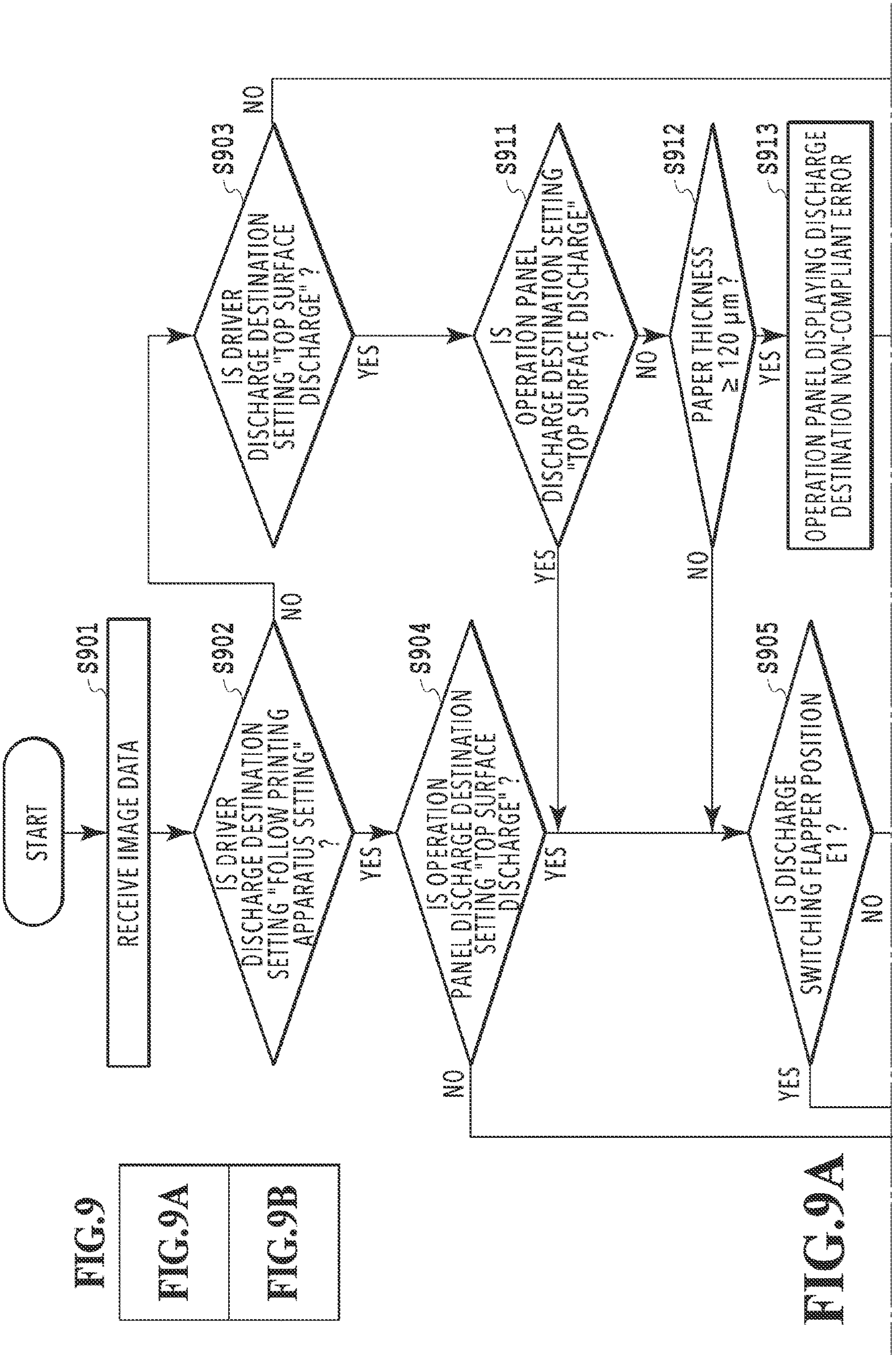
FIGS. 9A and 9B together form a flowchart relating to control for switching between discharge destinations.
Figure 9B:
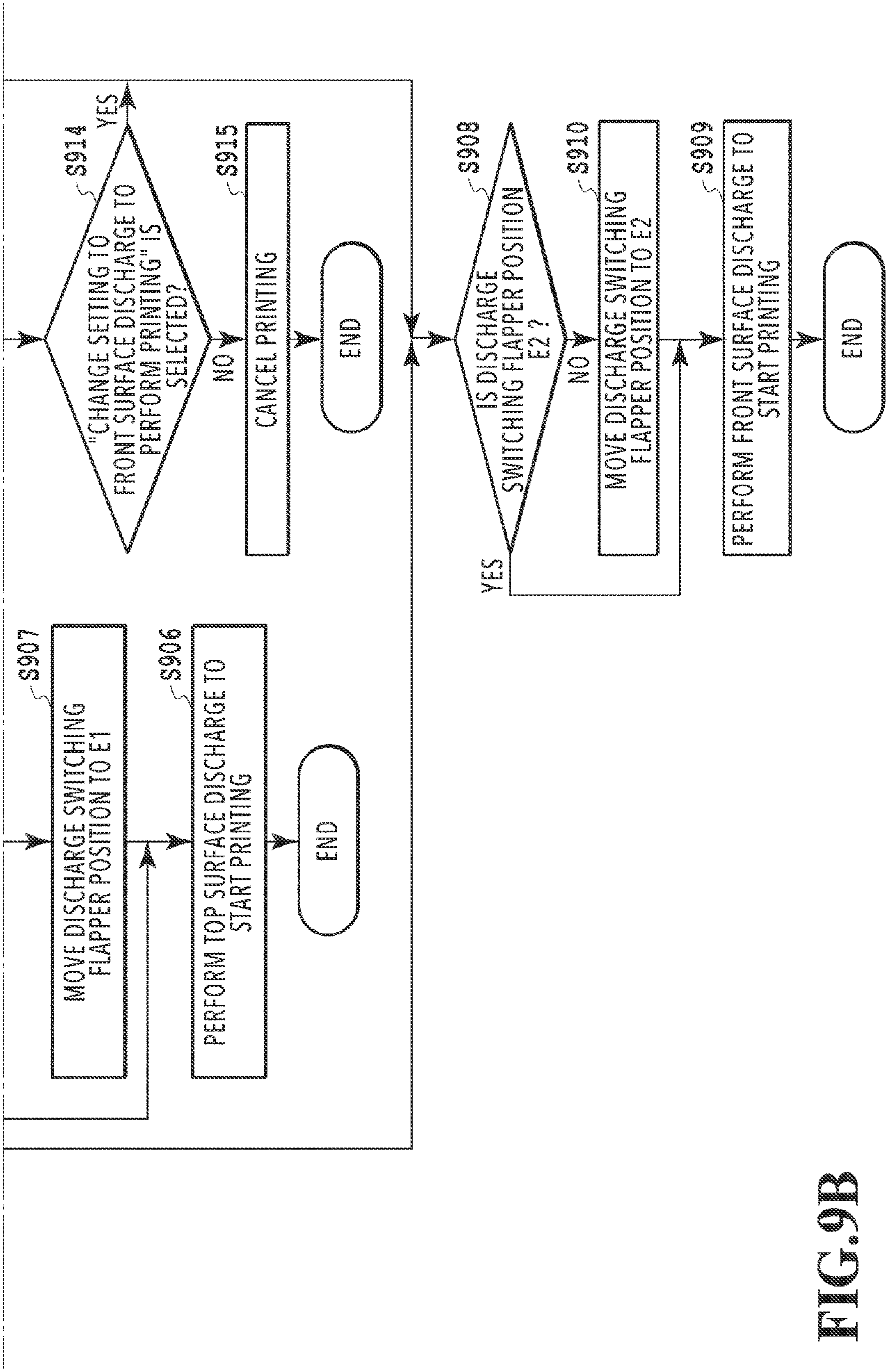

FIGS. 9A and 9B together form a flowchart relating to control for switching between the discharge destinations in the case of printing image data. The flowchart shown in FIGS. 9A and 9B is implemented by the CPU 201 of the printing apparatus 100 reading a program stored in the ROM 204 or the like into the RAM 203 and executing the program. The symbol "S" in the description of each process means a step in the flowchart (hereinafter, the same applies in the present specification).

In S901, the printing apparatus 100 receives and obtains the image data sent from the printing apparatus driver 701 of the host apparatus 700. If the CPU 201 of the printing apparatus 100 receives the image data in S901, the CPU 201 of the printing apparatus 100 checks the setting of the discharge destination in the printing apparatus driver 701 in S902. Specifically, in S902, the CPU 201 determines whether the setting in the printing apparatus driver 701 is "follow the printing apparatus setting." That is, the CPU 201 determines whether the designation of the discharge destination included in the setting information received from the printing apparatus driver 701 together with the image data indicates "follow the printing apparatus setting." If the setting in the printing apparatus driver 701 is "follow the printing apparatus setting," the process proceeds to S904. Otherwise, the process proceeds to S903.

In S904, the CPU 201 determines whether the discharge destination setting on the operation panel 2 is the "top surface discharge." If the setting on the operation panel 2 is the "top surface discharge," the thickness of the sheet 1 is not equal to or greater than a predetermined value (for example, 120 μm or more). This is because, as described above, if the thickness of the sheet 1 is equal to or greater than the predetermined value, the setting on the operation panel 2 cannot be set to the "top surface discharge." Therefore, if the setting on the operation panel 2 is the "top surface discharge," the top surface discharge can be performed. That is, in S904, checking that the top surface discharge is possible is also substantially performed. If the setting on the operation panel 2 is the "top surface discharge," the process proceeds to S905, and if the setting on the operation panel 2 is not the "top surface discharge," that is, if the setting on the operation panel 2 is the "front surface discharge," the process proceeds to S908.

In S905, the CPU 201 determines whether the position of the discharge switching flapper 22 is the E1 position. That is, the CPU 201 determines whether the discharge switching flapper 22 is in a position to perform the upper surface discharge. If the position of the discharge switching flapper 22 is the E1 position, the sheet 1 can be fed to the top surface discharge path 502. Thus, the process proceeds to S906, and printing is started using the top surface discharge. Then, the flow ends. On the other hand, if the position of the discharge switching flapper 22 is not E1, the discharge switching flapper 22 is in the E2 position. Thus, the process proceeds to S907, and the CPU 201 moves the position of the discharge switching flapper 22 to the E1 position. If the movement of the discharge switching flapper 22 to the E1 position is completed in S907, the process proceeds to S906, and printing is started using the top surface discharge. Then, the flow ends. In the present embodiment, the discharge switching flapper 22 is moved at the stage when printing is actually performed. Therefore, even if the setting on the operation panel 2 is the "top surface discharge" in S904, since the position of the discharge switching flapper 22 may not be E1, the determination control as in S905 is performed.

If the discharge destination setting on the operation panel 2 is the "front surface discharge" in S904, the process proceeds to S908. In S908, the CPU 201 determines whether the position of the discharge switching flapper 22 is the E2 position. That is, the CPU 201 determines whether the discharge switching flapper 22 is in the position to perform the front surface discharge. If the position of the discharge switching flapper 22 is the E2 position, the sheet 1 can be fed to the front surface discharge path 162. Thus, the process proceeds to S909, and printing is started using the front surface discharge. Then, the flow ends. On the other hand, if the position of the discharge switching flapper 22 is not E2, the discharge switching flapper 22 is in the E1 position. Thus, the process proceeds to S910, and the CPU 201 moves the position of the discharge switching flapper 22 to the E2 position. If the movement of the discharge switching flapper 22 to the E2 position is completed in S907, the process proceeds to S909, and printing is started using the front surface discharge. Then, the flow ends.

Next, a description will be given of a process in a case where in S902, it is determined that the setting of the discharge destination in the printing apparatus driver 701 is not "follow the printing apparatus setting." In S903, the CPU 201 determines whether the setting of the discharge destination in the printing apparatus driver 701 is the "top surface discharge." In the case of the top surface discharge, the process proceeds to S911, and in the case of not being the top surface discharge, that is, in the case of the "front surface discharge," the process proceeds to S908.

If it is determined in S903 that the setting in the printing apparatus driver 701 is the "top surface discharge," the CPU 201 determines, in S911, whether the setting of the discharge destination on the operation panel 2 is the "top surface discharge." If the setting in the printing apparatus driver 701 and the setting on the operation panel 2 are both the "top surface discharge," printing is performed using the top surface discharge. That is, if the setting on the operation panel 2 is the "top surface discharge," as described above, the sheet 1 does not have a thickness equal to or greater than the predetermined value (120 μm or more) and is in a state where the top surface discharge is possible. Therefore, if it is determined in S911 that the setting of the discharge on the operation panel 2 is the "top surface discharge," the process proceeds to S905. Step S905 and the subsequent steps are as described above.

On the other hand, in S911, if it is determined that the setting of the discharge destination on the operation panel 2 is not the "top surface discharge," that is, the setting of the discharge destination on the operation panel 2 is determined to be the "front surface discharge," the process proceeds to S912. A condition where the process proceeds to S912 is a case where the setting of the discharge destination in the printing apparatus driver 701 is the "top surface discharge" and the setting of the discharge destination on the operation panel 2 is the "front surface discharge," that is, a case where the setting in the printing apparatus driver 701 and the setting on the operation panel 2 are different. If the setting in the printing apparatus driver 701 and the setting on the operation panel 2 are different, the top surface discharge which is the setting in the printing apparatus driver 701 has priority as described above. However, at this point, the CPU 201 has not been able to check whether the sheet 1 can be used to perform the "top surface discharge." Then, in S912, the CPU 201 determines whether the paper thickness of the sheet is equal to or greater than the predetermined value (120 μm or more). If the paper thickness of the sheet is not equal to or greater the predetermined value, the sheet is not thick paper and can be used for the top surface discharge. Therefore, if it is determined in S912 that the paper thickness of the sheet is not equal to or greater than the predetermined value, the process proceeds to S905 and the subsequent steps. Step S905 and the subsequent steps are as described above. On the other hand, if the paper thickness of the sheet is equal to or greater than the predetermined value, the sheet is thick paper and the top surface discharge cannot be performed. Therefore, the process proceeds to S913, and the CPU 201 causes the operation panel 2 to display an error screen shown in FIG. 10.

Figure 10:
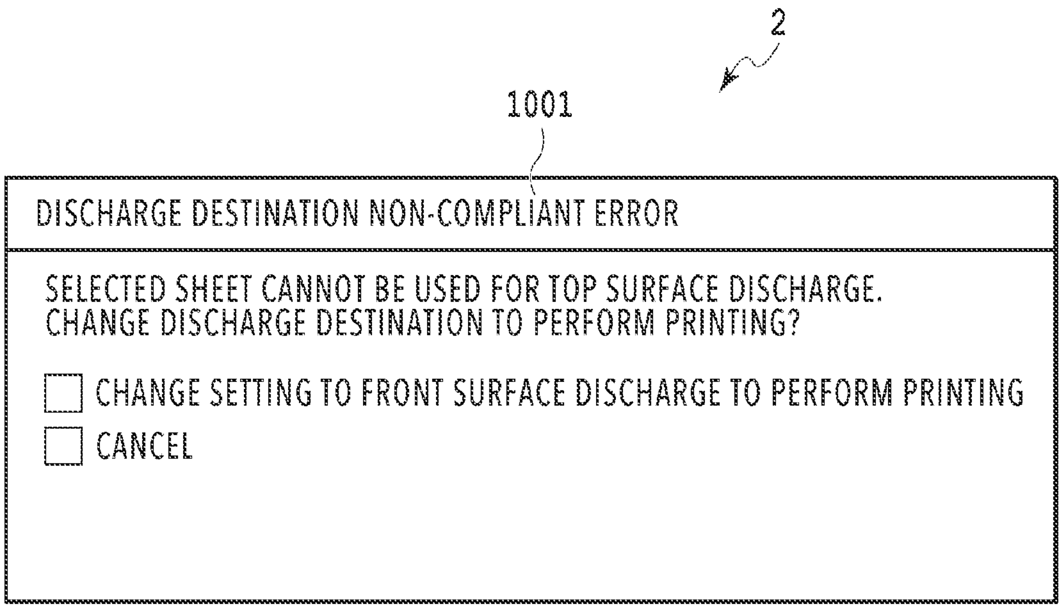
FIG. 10 is a diagram showing an example of a discharge destination non-compliant error screen displayed on the operation panel.

FIG. 10 is a diagram showing an example of a discharge destination non-compliant error screen 1001 displayed on the operation panel 2 in S913. If it is determined that the top surface discharge cannot be performed, the CPU 201 causes the operation panel 2 to display the discharge destination non-compliant error screen 1001. The user can select "change setting to the front surface discharge to perform printing" or "cancel" on the discharge destination non-compliant error screen 1001. In S914, the CPU 201 determines whether an operation by the user selects "change setting to the front surface discharge to perform printing." In the case of "change setting to the front surface discharge to perform printing," the setting of the discharge destination is changed to the "front surface discharge" and the process proceeds to S908. Since step S908 and subsequent steps are the operation of the discharge switching flapper described above, descriptions thereof will be omitted. On the other hand, if the operation by the user does not select "change setting to the front surface discharge to perform printing," that is, if "cancel" is selected, the process proceeds to S915 and the CPU 201 cancels printing.

Next, a description will be given of a case where the setting in the printing apparatus driver 701 is the "front surface discharge." That is, a case where determination results in steps S902 and S903 are both NO will be described. If the setting in the printing apparatus driver 701 is the "front surface discharge," it is decided to perform the front surface discharge regardless of the discharge destination setting on the operation panel 2. This is because, as described above, the setting in the printing apparatus driver 701 has priority, and no problem arises due to the front surface discharge. That is, even if the setting in the printing apparatus driver 701 and the setting on the operation panel 2 are different, in the case of the front surface discharge, the sheet can be discharged even if the thickness of the sheet 1 is equal to or greater than the predetermined value. As a result, the front surface discharge which is the setting in the printing apparatus driver 701 has priority. If the determination result in step S903 is NO, the process proceeds to S908. Since step S908 and subsequent steps are the operation of the discharge switching flapper described above, descriptions thereof will be omitted.

As described above, in the present embodiment, in the case of performing printing based on the image data received from the printing apparatus driver 701, even if the setting of the discharge destination in the printing apparatus driver 701 is the "top surface discharge," depending on the kind of sheet 1, control is performed so that the top surface discharge is not performed. As a result, in the case of performing the top surface discharge using a discharge path with a curved portion, it is possible to suppress a phenomenon in which conveyance is not appropriately performed due to, for example, a large paper thickness.

<Control for Switching between Discharge Destinations in the Case of Printing a Head Adjustment Pattern>

Figure 11:
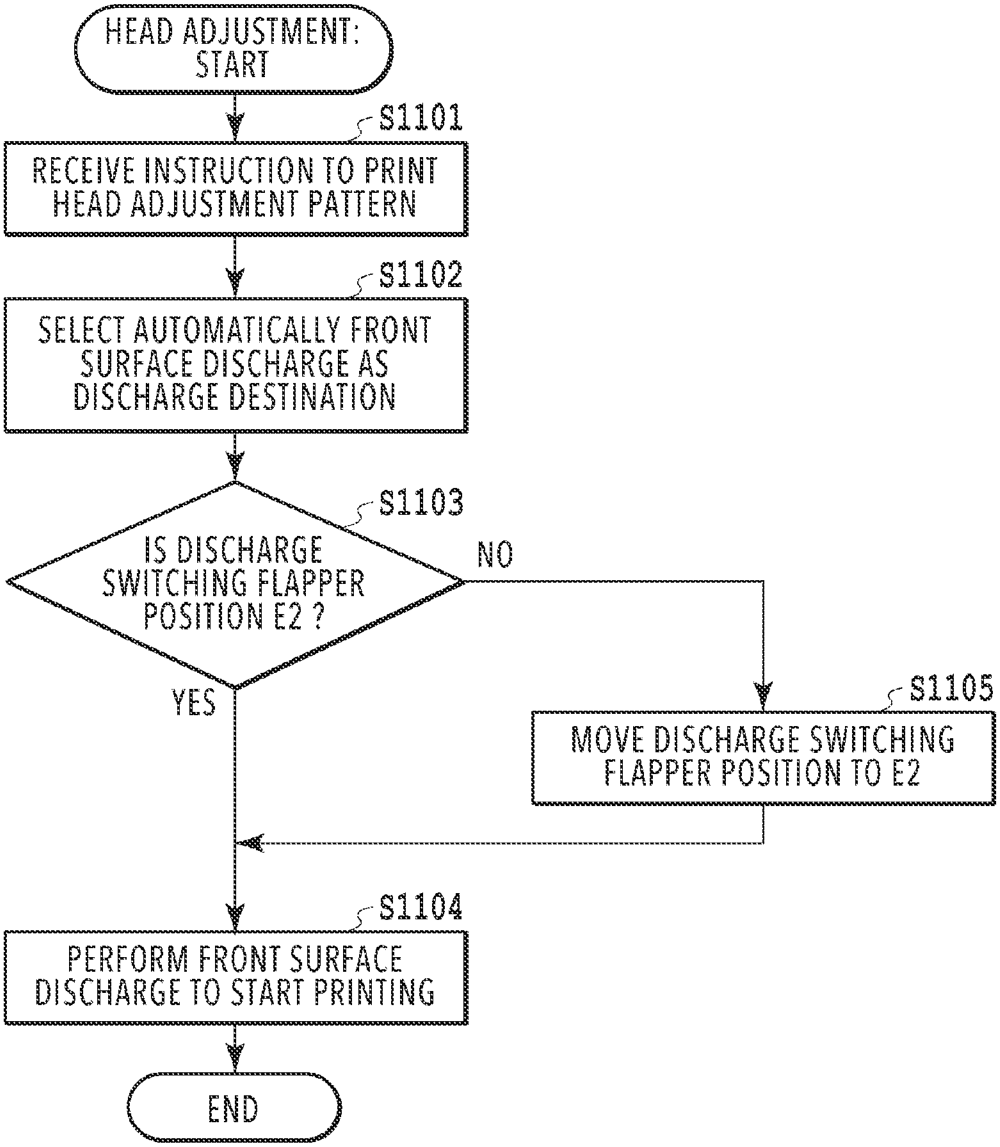
FIG. 11 is a flowchart showing control for switching between discharge destinations.

FIG. 11 is a flowchart showing control for switching between discharge destinations in the case of printing a head adjustment pattern for the print head 18. As described above, in the case of adjusting the print head 18, the adjustment is performed by printing the head adjustment pattern. In the case of printing the head adjustment pattern, switching control different from the control for switching between the discharge destinations described in FIG. 10 is performed.

In S1101, the CPU 201 receives an instruction to print the head adjustment pattern. The instruction to print the head adjustment pattern may be received and obtained from the printing apparatus driver 701, or may be obtained in response to an operation through the operation panel 2. If the instruction to print the head adjustment pattern is received, the process proceeds to S1102, and the CPU 201 automatically selects the "front surface discharge" as the discharge destination. That is, the CPU 201 automatically determines to perform the front surface discharge regardless of the discharge destination setting in the printing apparatus driver 701 and the discharge destination setting on the operation panel 2. If the sheet 1 is inverted in a discharge path having a curved portion such as the top surface discharge path 502, the sheet may be skewed and bent due to the conveyance resistance, so that a stored adjustment value may change. The stored adjustment value may also change due to conveyance using the discharge roller 25. Further, depending on the configuration of the top surface discharge path 502, the adjustment pattern may be printed on the sheet 1 in a state where the sheet 1 is passing through the discharge path having the curved portion, or in a state where the discharge roller 25 is gripping the sheet 1 before cutting. In this case, the print position may also shift. Therefore, there is a possibility that the print head 18 is not adjusted appropriately. On the other hand, in a case where the discharge path such as the front surface discharge path 162 is linear, the conveyance resistance of the sheet 1 is small, and the sheet 1 is less likely to be skewed. Thus, a phenomenon in which the stored adjustment value changes hardly occurs. Accordingly, in printing of the head adjustment pattern, the front surface discharge in which the sheet passes through the front surface discharge path 162 is selected. If the front surface discharge is selected in S1102, the operations of S1103 to S1105 are performed. Since these operations are the same as the operations of the discharge switching flapper 22 (S908 to S910) described in FIG. 10, descriptions thereof will be omitted.

<Control for Switching between Discharge Destinations in the Case of Printing a Conveyance Adjustment Pattern>

Figure 12:
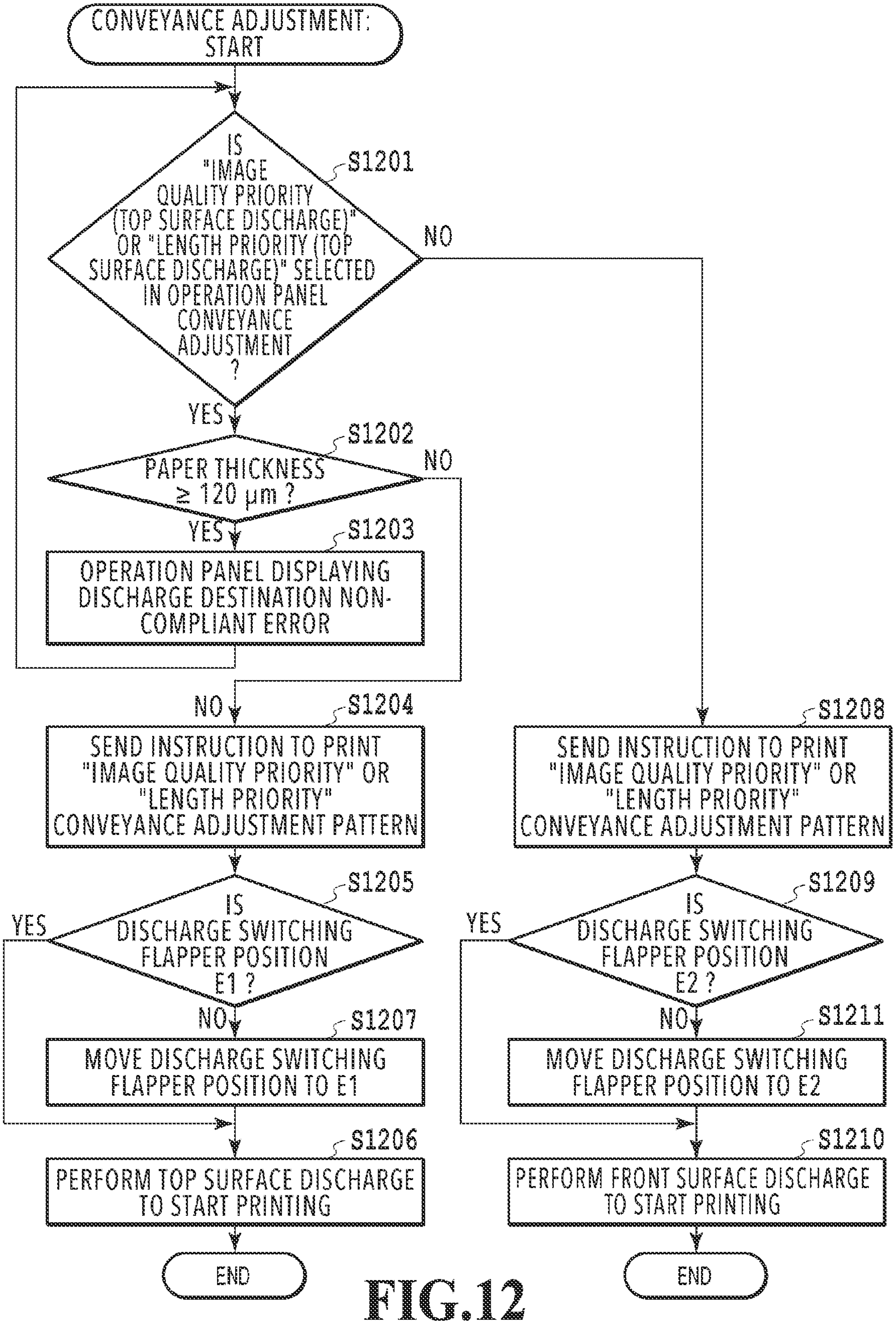
FIG. 12 is a flowchart showing control for switching between discharge destinations.

FIG. 12 is a flowchart showing control for switching between the discharge destinations in the case of performing conveyance adjustment pattern printing. As described above, the amount of conveyance of the discharge roller 14 is adjusted by printing of the conveyance adjustment pattern. Further, in the case of the top surface discharge, the amount of conveyance of the conveyance roller 14 is adjusted also in consideration of a conveyance effect caused by the discharge roller 25.

The conveyance adjustment pattern used for adjusting the amount of conveyance includes a pattern for adjustment in which image quality has priority and a pattern for adjustment in which the length of the image has priority. The difference between these patterns will be briefly described. The image is printed by alternately repeating the operation of scanning the print head 18 to perform printing and the operation of conveying the sheet. For example, the print head 18 is scanned in a direction intersecting the conveyance direction of the sheet 1 to print the image (first printing), and then the sheet 1 is conveyed by the length of a printed portion, and the print head 18 is scanned to print the image (second printing). Here, in a case where the amount of conveyance of the sheet 1 is large (the length of conveyance is large), a gap is formed between the first printing and the second printing, and a streak that is not printed is made. On the other hand, in a case where the amount of conveyance is small (the length of conveyance is small), the first printing and the second printing overlap each other, and a streak having high density is made in the overlapped portion of the image. An image-quality-priority pattern is a pattern for performing the adjustment so as not to cause the streak.

In the case of giving priority to image quality to perform the adjustment, an adjustment pattern for detecting the density of the printed image is printed to detect the density of a printed portion with a sensor, so that the amount of conveyance is adjusted. On the other hand, in the case of giving priority to a length, the length of the image is adjusted so that for example, a 100-mm image can be printed to a size of 100 mm. In the case of giving priority to a length to perform the adjustment, an adjustment pattern having a predetermined length is printed to measure the length of the printed pattern, and the amount of conveyance is adjusted by the amount of deviation in length. In either case, it is necessary to adjust the amount of conveyance in the case of passing through the actual discharge path. A description will be given below of the control for switching between the discharge destinations in the case of printing the conveyance adjustment pattern with reference to FIG. 12.

In S1201, the CPU 201 determines an item selected by the user on a conveyance adjustment screen on the operation panel 2. Incidentally, an example in which the conveyance adjustment screen is displayed on the operation panel 2 will be described herein, but the conveyance adjustment screen may be displayed on the printing apparatus driver 701.

Figure 13:
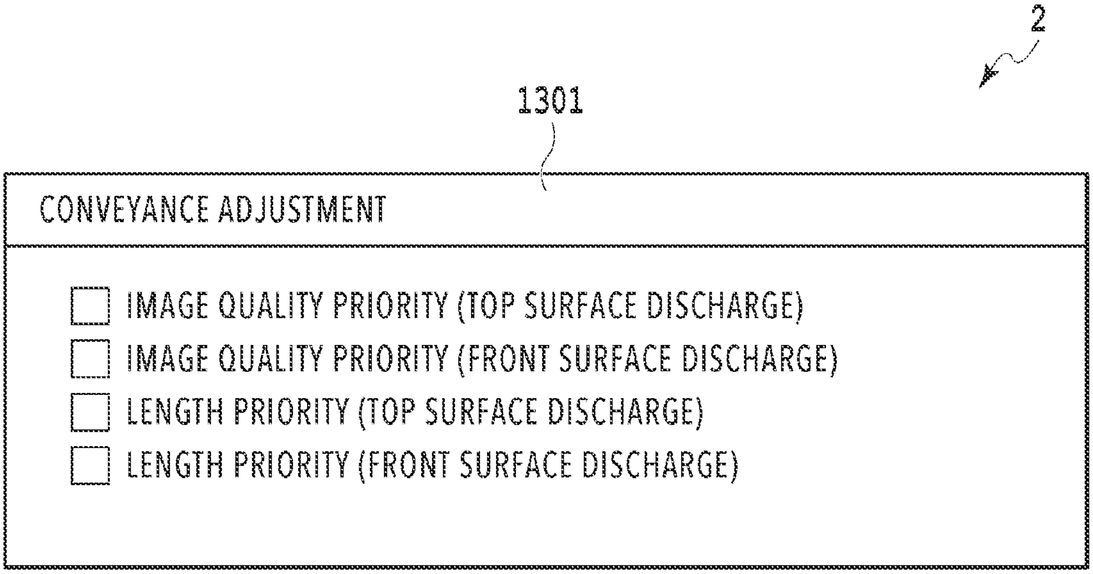
FIG. 13 is a diagram showing a conveyance adjustment screen displayed on the operation panel.

FIG. 13 is a diagram showing a conveyance adjustment screen 1301 displayed on the operation panel 2. In the case of performing the conveyance adjustment, the user selects a desired target from "image quality priority (top surface discharge)," "image quality priority (front surface discharge)," "length priority (top surface discharge)," and "length priority (front surface discharge)" on the conveyance adjustment screen 1301. There is a difference in conveyance resistance between the top surface discharge path 502 and the front surface discharge path 162, and the amounts of conveyance are also different. Therefore, in the present embodiment, in the case of adjusting the amount of conveyance of the top surface discharge path 502 or the amount of conveyance of the front surface discharge path 162, the conveyance adjustment pattern is printed with the sheet 1 passing through each discharge path. As a result, the amount of conveyance in each discharge path can be adjusted correctly.

In S1201, the CPU 201 determines whether "image quality priority (top surface discharge)" or "length priority (top surface discharge)" is selected. If "image quality priority (top surface discharge)" or "length priority (top surface discharge)" is selected, the process proceeds to S1202. Otherwise, the process proceeds to S1208.

In S1202, the CPU 201 determines whether the paper thickness is equal to or greater than the predetermined value (120 μm or more). If the paper thickness is not equal to or greater than the predetermined value, the sheet is not thick paper, and therefore, the top surface discharge can be performed. Accordingly, the process proceeds to S1204, and the CPU 201 sends an instruction to print the image-quality-priority or length-priority conveyance adjustment pattern. Then, the operations of S1205 to S1207 are performed. Since these operations are the same as the operations of S905 to S907, descriptions thereof will be omitted. On the other hand, if the paper thickness is equal to or greater than the predetermined value, the sheet is thick paper, and therefore, the top surface discharge cannot be performed.

Thus, the process proceeds to S1203, and as shown in FIG. 7, the discharge destination non-compliant screen 705 is displayed on the operation panel 2 to display a message saying, for example, that "the selected sheet cannot be used for the top surface discharge." The user's selecting "OK" on the operation panel 2 takes the screen back to the conveyance adjustment screen 1301 shown in FIG. 13.

In a case where "image quality priority (front surface discharge)" or "length priority (front surface discharge)" is selected on the conveyance adjustment screen 1301, the process proceeds from S1201 to S1208, and the CPU 201 sends an instruction to print the image-quality-priority or length-priority conveyance adjustment pattern. Then, the operations of S1209 to S1211 are performed. Since these operations are the same as the operations of S908 to S910, descriptions thereof will be omitted.

As described above, according to the present embodiment, an appropriate discharge destination can be determined depending on the kind of sheet (paper thickness) or the target to be adjusted. Thus, the sheet is discharged using an appropriate discharge path, so that it is possible to suppress trouble in discharge such as conveyance not being appropriately performed, and to improve image quality by increasing adjustment accuracy.

Other Embodiments

In the embodiment described above, the example is described in which the movement control of the discharge switching flapper 22 is performed at the time when a sheet is actually conveyed, but the present invention is not limited to this. In a case where the discharge path on the operation panel 2 is selected, control may be performed so that the discharge switching flapper 22 moves at the time of the selection. In a case where the necessity to move the discharge switching flapper 22 arises, such as a case where the setting in the printing apparatus driver 701 is different from the setting on the operation panel 2, control may be performed to additionally move the discharge switching flapper 22.

In the embodiment described above, as shown in FIG. 10, the example is described in which the discharge destination non-compliant error screen 1001 is displayed on the operation panel 2 and the user performs the operation on the operation panel 2, but the present invention is not limited to this. The printing apparatus driver 701 may display an error screen equivalent to that shown in FIG. 10, and an instruction may be input on the printing apparatus driver 701.

In the embodiment described above, the example is described in which in the operation on the discharge destination setting screen 601 on the operation panel 2 shown in FIG. 6, in a case where the paper thickness of the sheet 1 is equal to or greater than the predetermined value, an error screen is displayed if the top surface discharge is selected, but the present invention is not limited to this. In the operation on the discharge destination setting screen 601, in a case where the paper thickness of the sheet 1 is equal to or greater than the predetermined value, the error screen may not be displayed if the top surface discharge is selected. That is, the top surface discharge may be selected even in the above state. In this case, the paper thickness may be checked each time in a case where the top surface discharge is designated in response to a print instruction. Specifically, in the flowchart in FIGS. 9A and 9B, in a case where a determination result in S904 is YES and in a case where a determination result in S911 is YES, steps S912 to S915 may be performed.

In the flowchart of the embodiment described above, at the time of selecting the top surface discharge, it is determined whether the paper thickness is equal to or greater than the predetermined value. However, whether the kind of sheet is a predetermined kind may also be determined. For example, a sheet on which static electricity is generated due to the material of the sheet so that the conveyance resistance increases may be set in advance as a predetermined kind of sheet, and a determination process may be performed so that the top surface discharge can be performed in a case where the sheet is not of the predetermined kind. Further, even in the case of performing determination based on the paper thickness, the kind of sheet and the paper thickness may be associated with each other so as to determine whether the kind of sheet is the predetermined kind in the actual determination process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-165465, filed Sep. 30, 2020, which is hereby incorporated by reference herein in its entirety.

What is claimed is:

1. A printing apparatus comprising:

a holding unit configured to hold a roll-shaped print medium;

a printing unit configured to apply ink and thereby print an image on the print medium drawn out from the holding unit;

a first discharge destination to which the print medium on which the image is printed is discharged after passing through a first discharge path in a first direction;

a second discharge destination to which the print medium on which the image is printed is discharged after passing through a second discharge path in a second direction opposite to the first direction;

a cutter configured to cut the print medium, the cutter being arranged on a downstream side of the printing unit and on an upstream side of a branching of the first discharge path and the second discharge path;

an obtaining unit configured to obtain information indicating a kind of the print medium held by the holding unit; and a switching unit configured to switch, based on the information, which of the first discharge destination and the second discharge destination is to be a discharge destination of the print medium on which the image is printed.

2. The printing apparatus according to claim 1, wherein the information is obtained based on a user's input of print medium type information.

3. The printing apparatus according to claim 1, wherein the information is obtained based on a result of print medium detection by a sensor.

4. The printing apparatus according to claim 1, further comprising an input unit configured to receive a user's input of a discharge destination setting, wherein the switching unit switches the discharge destination further based on the discharge destination setting.

5. The printing apparatus according to claim 1, wherein the switching unit switches the discharge destination further based on discharge destination information included in an instruction to print an image.

6. The printing apparatus according to claim 5, wherein the discharge destination information included in the instruction is any of the first discharge destination, the second discharge destination, and a discharge destination setting made before the instruction.

7. The printing apparatus according to claim 1, wherein the first discharge path includes a curved shape and the second discharge path does not include a curved shape.

8. The printing apparatus according to claim 1, wherein the first discharge path is provided with a discharge roller and the second discharge path is not provided with a discharge roller.

9. The printing apparatus according to claim 1, further comprising a conveyance roller upstream of the printing unit, wherein an angle formed between a conveyance direction of the conveyance roller and the first direction is less than an angle formed between the conveyance direction and the second direction.

10. The printing apparatus according to claim 1, wherein the switching unit is a flapper.

11. The printing apparatus according to claim 1, wherein the printing unit comprises a plurality of energy generating elements to eject ink.

12. The printing apparatus according to claim 1, wherein the printing unit prints an image on a print medium by scanning in a direction intersecting a direction in which the print medium is conveyed.

13. The printing apparatus according to claim 1, wherein the first discharge destination is provided on an upper side of the printing unit with respect to a gravity direction and the second discharge destination is provided on a lower side of the printing unit with respect to the gravity direction.

* * * * *